United States Patent [19]
Kyriazis

[11] Patent Number: 5,416,311
[45] Date of Patent: May 16, 1995

[54] DATA STORAGE DEVICE WITH MULTIPLE LEVELS OF SPACIAL DENSITY

[75] Inventor: Vassilis D. Kyriazis, Palo Alto, Calif.

[73] Assignee: Canon Kabushiki Kaisha, Tokyo, Japan

[21] Appl. No.: 684

[22] Filed: Jan. 5, 1993

[51] Int. Cl.⁶ .............................. G06K 19/06
[52] U.S. Cl. .................. 235/494; 235/454; 235/456
[58] Field of Search ............... 235/494, 487, 493, 454, 235/456

[56] References Cited

U.S. PATENT DOCUMENTS

| 4,263,504 | 4/1981 | Thomas | 235/494 X |
| 4,924,078 | 5/1990 | Sant'Anselmo et al. | 235/494 |
| 4,926,035 | 5/1990 | Fujisaki | 235/494 |
| 4,939,354 | 7/1990 | Priddy et al. | 235/494 X |
| 4,947,383 | 8/1990 | Hudson | 235/494 X |
| 5,101,096 | 3/1992 | Ohyama et al. | 235/494 X |
| 5,153,418 | 10/1992 | Batterman et al. | 235/456 X |
| 5,288,986 | 2/1994 | Pine et al. | 235/494 |
| 5,296,693 | 3/1994 | Hughes-Hartogs | 235/494 |

Primary Examiner—Donald Hajec
Assistant Examiner—Jeffrey R. Filipek
Attorney, Agent, or Firm—Paul Hentzel

[57] ABSTRACT

A row and column based storage device stores data at multiple density levels. The bulk of the stored data is record data, and is stored at higher density levels to minimize the storage area required. The control information and system parameters are stored at lower density levels for maximum reliability. Lost or damaged record data may be recovered through error correction parity data. However, lost control information or system parameters results in catastrophic failure of the storage device.

37 Claims, 3 Drawing Sheets

DATA STORAGE DEVICE WITH MULTIPLE LEVELS OF SPACIAL DENSITY

TECHNICAL FIELD

This invention relates to multi-density data storage devices, and more particularly to such devices in which different classes of data are stored on a paper medium at different spacial densities.

BACKGROUND

Digital data has been recorded as punched holes in a paper medium in the form of paper tape and IBM cards. The hole entries were uniform in size and necessarily large, resulting in a low, single density data format. Digital data has also been recorded on paper medium by the conventional printing of ink pigments. The pigment entries were uniform in size and smaller then the punched holes, producing a higher, single density format. U.S. Pat. No. 5,296,693, issued Mar. 22, 1994 (Ser. No. 07/807,227, filed 16 Dec. 1991) entitled "Data Format For Recording Digital Data and Method" by Dirk Hartogs (and assigned to the present assignee) teaches digital data recorded on paper medium with toner ink. Neither of these types of prior art storage devices contain multiple density storage levels for multiple classes of stored data.

SUMMARY

It is therefore an object of this invention to provide a multi-density storage device for recording digital data.

It is another object of this invention to provide such a multi-density storage device for storing control information at a lower density level which is physically more stable.

It is further object of this invention to provide such a multi-density storage device for storing record data at a higher density level which is more compact.

It is a further object of this invention to provide such a multi-density storage device in which the data format may be varied to suit particular data and applications.

Briefly, these and other objects of the present invention are accomplished by providing a multi-density data storage device for storing record data and control information at N levels of spacial density. A base medium carries the stored record within one or more storage areas each containing a plurality of storage sites. The storage sites are in predetermined positions and at the N levels of spacial density. The position and spacial density of the storage sites is defined by a row-column coordinate system across the storage area. Recording material is deposited at the storage sites for defining the record data and control information by the selective presence and absence of the recording material. Record data is stored in the highest density storage sites of the N levels of spacial density, and control information is stored in the lowest density storage sites. The control information includes low density storage sites which identify the position of the rows and columns in the storage area coordinate system. The position of the rows and columns in the coordinate system are identified by row and column coordinate marks at selected low density storage sites. The row coordinate marks extend in the direction of the columns of the storage area, forming a column of row low density storage sites. The column coordinate marks extend in the direction of the rows forming a row of column low density storage sites. The coordinate marks are deposited at uniform intervals from one coordinate mark to the next. The low density storage sites in the intervals between the coordinate marks contains at least one orientation mark defining the orientation of the storage area.

BRIEF DESCRIPTION OF THE DRAWING

Further objects and advantages of the present multi-density data storage system will become apparent from the following detailed description and drawing (not drawn to scale) in which.

Figure 1:
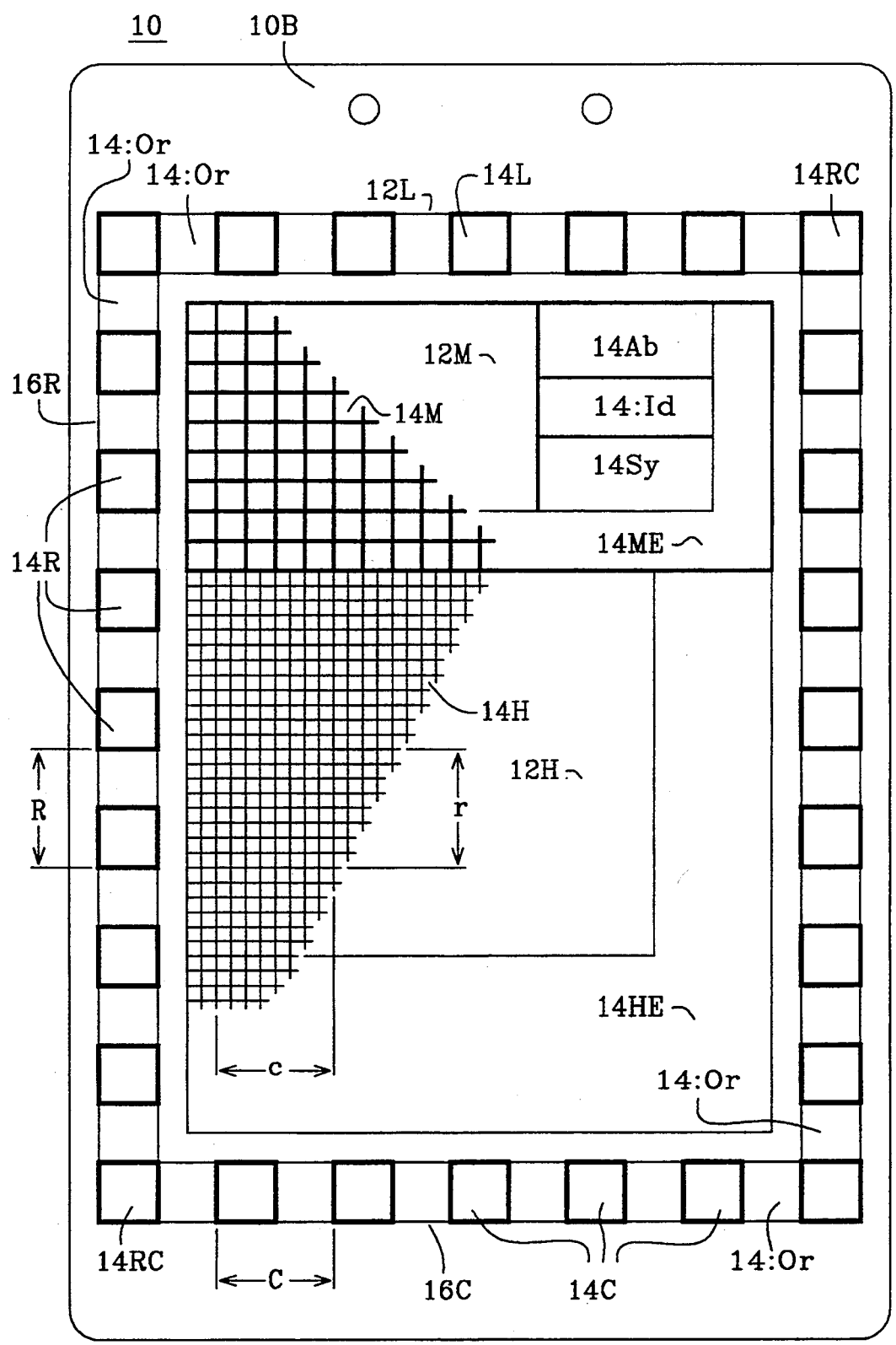
FIG. 1 is a diagram of a base medium with three levels of spacial density for storing data within a low density perimeter of control information.

The first digit of each reference numeral in the above figures indicates the figure in which that element is shown. The second digit indicates like structural elements, and the final letter indicates a sub-portion of an element.

GENERAL DESCRIPTION (FIG. 1)

Figure 5:
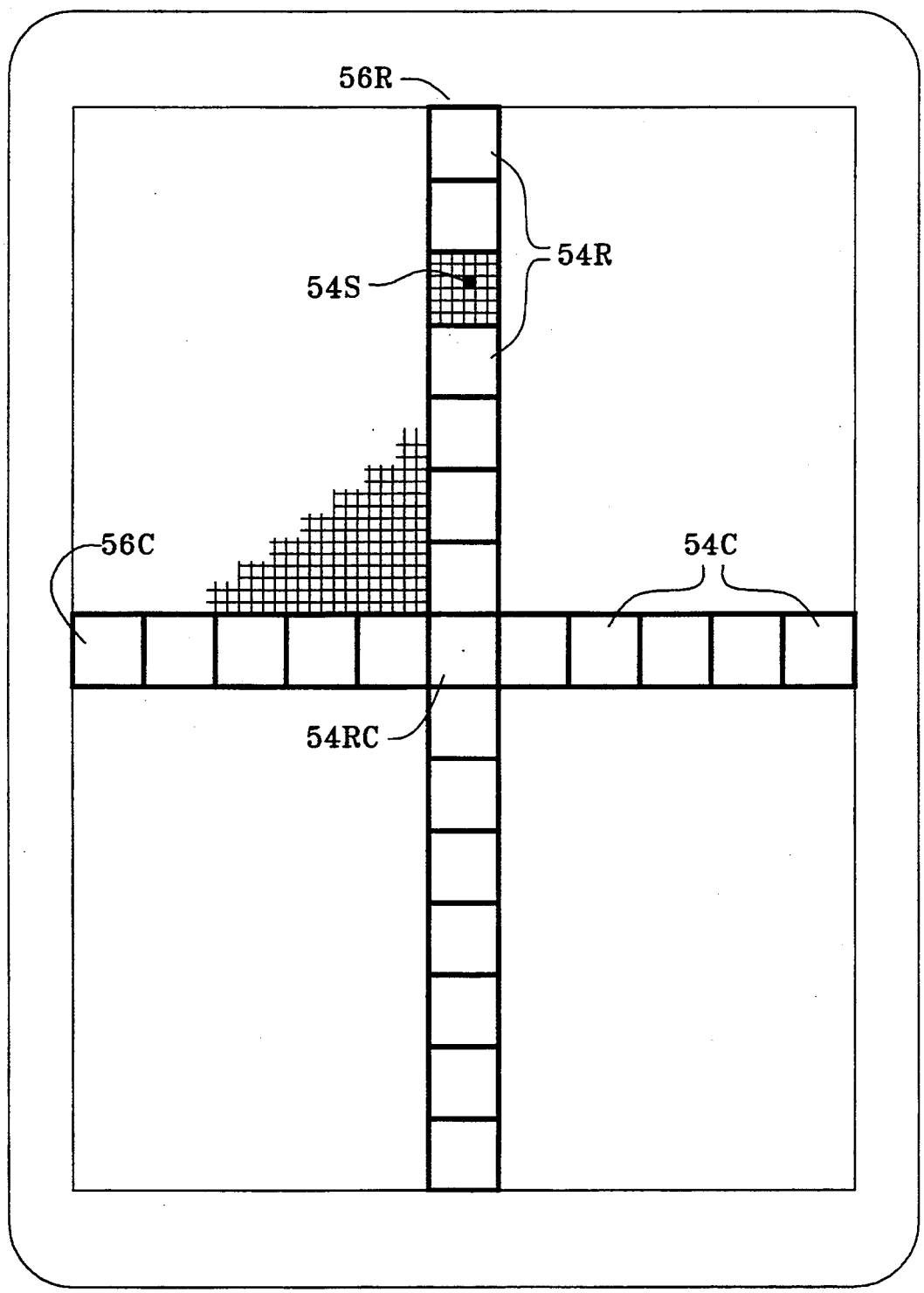
FIG. 5 is a diagram of a storage area with two levels of spacial density defined by internal coordinate marks and a sample high density entry.

A multi-density data storage device 10 is shown in FIG. 1 for storing record data and control information at N levels of spacial density. A base medium 10B carries the stored data. The base medium has one or more mass storage areas therein at each of N levels of spacial density which extend from a lowest level of low density storage, to a highest level of high density storage. Three levels are shown in FIG. 1 (N=3), a low density level in peripheral storage area 12L (bold lines), a medium density level in upper storage area 12M (medium lines), and a high density level in lower storage area 12H (light lines). However, the number of levels may be greater then three or less than three. The embodiment of FIG. 5 shows two levels of spacial density (N=2). Each mass storage area contains a plurality of individual storage sites in predetermined positions at the corresponding level of density. In the low-medium-high embodiment of FIG. 1, the individual storage sites are 14L, 14M and 14H. The spacial area of the storage sites at each level of spacial density is greater then the spacial area of the storage sites in the next higher level of spacial density.

Recording material is deposited onto the base medium at storage sites within the storage areas. The deposited recording material defines the record data and control information in the N levels of spacial density by the selective presence and absence of recording material. Record data is preferably stored by recording material deposited in the highest density storage sites 14H.

Row/Column Coordinate System

The position and spacial density of each individual storage site is defined by a row-column coordinate system across the storage area containing the storage site. Control information includes particular low density storage sites which identify the position of the rows and columns within the coordinate system, and is preferably stored in the lowest density storage sites 14L. In the embodiment of FIG. 1, the position of the rows in the coordinate system are identified by row coordinate marks contained within an area 14R (indicated by bold squares) at particular low density storage sites. The position of the columns are similarly identified by column coordinate marks 14C. The row coordinate marks may extend in the direction of the columns of the storage area, forming a column 16R of row low density storage sites. The column coordinate marks may likewise extend in the direction of the rows forming a row 16C of column low density storage sites. Column 16R of row coordinate marks 14R may extend externally along one side of the storage area, (or internally see FIG. 5) and row 16C of column coordinate marks 14C may extend externally along one end of the storage area. Alternatively as shown in FIG. 1, the row coordinate marks 14R may form two columns, one on either side of the storage area. Similarly, the column coordinate marks 14C may form two rows, one at either end of the storage area. The two columns and two rows extend around the perimeter of the storage area forming peripheral storage area 12L of low density storage sites. The corner low density storage sites 14RC at the four corners of the perimeter serve as coordinate marks for both the rows and the columns.

The row coordinate marks 14R may be deposited at intervals along column 16R as shown in FIG. 1. Similarly, the column coordinate marks 14C may be deposited at intervals along row 16C. The row interval from one row coordinate mark to the next along column 16R may be a uniform interval of "R" (uppercase) low density storage sites. Similarly, the column interval along row 16C may be "C" (uppercase) low density storage sites. As shown in the embodiment of FIG. 1, the "R" interval is equal to the "C" interval, both of which include two coordinate marks. That is, the interval between coordinate marks may be two low density storage sites, with the coordinate marks occupying every other storage site along column 16R and row 16C. The alternate storage sites between the coordinate marks are available for other classes of control information. The row interval is also "r" (lowercase) rows of the highest level storage sites of the N levels of spacial density. In the embodiment of FIG. 1, the two low density storage sites interval corresponds to eight rows of high density storage sites (or 4 rows of medium density storage sites). Similarly, the column interval "c" (lowercase) is also eight columns of the highest level storage sites.

In the embodiment of FIG. 1, the storage sites at each level of spacial density have four times the area of the storage sites of the next higher level of spacial density. That is, medium density storage sites 14M are four times larger than high density storage sites 14H; and low density storage sites are four times larger than medium density storage sites 14M. For the square shaped storage sites shown in FIG. 1, the storage sites at each level of spacial density have an edge dimension twice the edge dimension of the storage sites of the next higher level of spacial density. That is, the medium density storage sites are twice as long and twice as wide as the high density storage sites; and the low density storage sites are twice as long and wide as the medium density storage sites. This systematic doubling of the storage sites edge dimension permits a more convenient addressing format for the database within storage device 10.

Orientation Marks

The other classes of control information contained in the alternate low density storage sites in the intervals between the coordinate marks, may include at least one orientation mark defining the orientation of the storage area. The orientation marks are located at predetermined low density storage sites, along one or more edges of perimeter 12L. In the embodiment of FIG. 1, four orientation marks 14:Or are provided, one within each of the four edges of peripheral storage area 12L. Orientation marks 14:Or are located in the alternate low density site immediately adjacent to each of the corner coordinate sites 14RC. As the stored data is processed through various storage stages, the original orientation of the data within the storage area may always be determined by the orientation marks. The stored data may printed from electronic memory onto the base medium, stored for years, and then scanned back into electronic memory. The orientation mark accompanies the stored data in each storage stage for identifying the top or bottom of the storage area, or the leading edge for printing and scanning.

Figure 2:
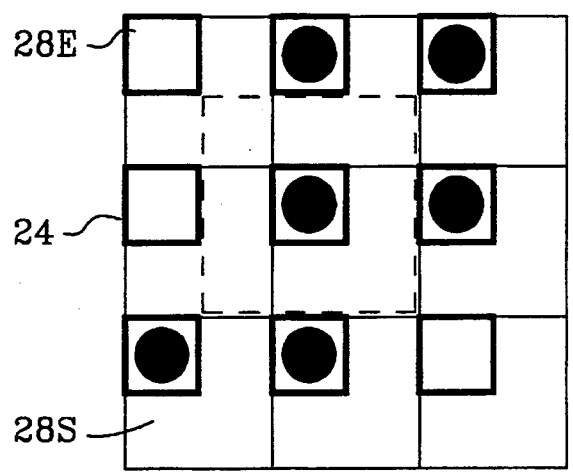
FIG. 2 is a diagram of a matrix of storage sites each having a single entry portion for receiving a single bit of data.
Figure 3:
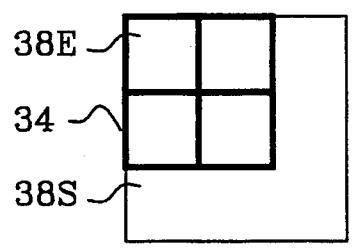
FIG. 3 is a diagram of a sole storage site having a plurality of entry portions.
Figure 4:
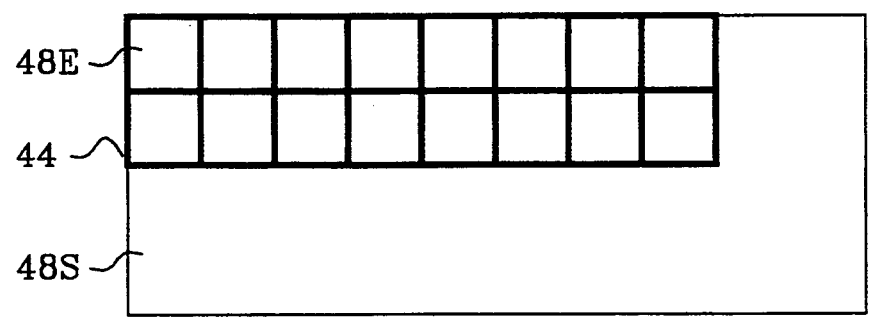
FIG. 4 is a diagram of a sole storage site having a data capacity of one byte with a double width spacer portion.

STORAGE SITE EMBODIMENTS (FIGS. 2, 3 and 4)

The storage sites at each of the N levels of spacial density have at least one entry portion for receiving the deposited recording material, and a spacer portion for maintaining a spacer distance between the entry portions of adjacent storage sites. The embodiment shown in FIG. 2 shows a matrix of adjacent storage sites 24 each having a single entry portion 28E (indicated by bold lines) occupying one corner of each storage site. The other three corners of the remainder of the storage site form spacer portion 28S. Single entry portion 28E contains a single bit of stored data. Some of the entry portions have deposited recording material (solid black dot) and represent a stored "1" bit. Other entry portions are empty without deposited recording material (voids) and represent a stored "0" bit. The spacer portions establish a band of space (shown in dashed lines for the central entry portion) around each entry portion for isolating the entry portion from the entry portions in the adjacent storage sites. The smallest area reliably defined by the row and column coordinate system of the storage area in the highest of the N levels of spacial density is a basic storage pixel. The entry portion of the highest density storage sites in the highest storage level, is one basic storage pixel containing one bit of stored data. The spacer portion of the highest density storage sites provides a basic storage pixel of space between adjacent storage sites.

A more compact data arrangement within the storage sites provides a plurality of entry portions for containing a plurality of bits of stored data. The embodiment of FIG. 3 shows a sole storage site 34 with four entry portions 38E per storage site with a corresponding increase in the data capacity of the overall storage area.

The embodiment of FIG. 4 has eight entry portions enough for one standard byte of stored data. Additional isolation of adjacent storage sites may be established by increasing the dimensions of the spacer portions. Spacer portions 48S in FIG. 4 are two entry portions across which doubles the width of the band of isolation. The E entries in L locations technique described in aforementioned U.S. Pat. No. 5,296,693, issued Mar. 22, 1994 (Ser. No. 07/807,227, filed 16 Dec. 1991) by Dirk Hartogs may be employed to increase the reliability of high density data stored in the high density storage sites.

CLASSES OF STORED DATA

The data stored in the storage sites is generally of two classes, record data and control information. Record data typically forms the major share of the stored data and includes the text of stored documents, numerical raw data, graphics, various binary files, and error correction parity data for each form of record data. Special forms of record data may include abstracts of the text, the file name of each record, and a the location of a backup or master file containing the original record data. Record data loss due to an impairment of the base medium (or missing for other reasons) results in a data loss proportional to the area of impairment. Such losses can normally be recovered by means of the error correction data.

Control information typically forms the minor share of the stored data and provide marks on the base medium (coordinate interval marks 14R and 14C, orientation marks 14:Or, and high density sample mark 54S) and system parameters of the database. The system parameters define the data density, the number of levels of spacial density, the data format of each storage area, the arrangement of the entry portions within the storage sites at each density level, the nature of the record data (i.e. text or image), encryption measures (if any), error correction protocol for recovery lost data, and other essential database operating information. Control information loss due to a base medium impairment causes a catastrophic data loss in which the record data cannot be accessed or otherwise processed. Such losses are normally not recoverable.

Row and column error code parity data may be employed at all levels of spacial density. In the embodiment of FIG. 1, error code parity data is shown in the medium density storage area 12M as stored data 14ME and in the high density storage area 12H as stored data 14HE. An abstract of the record data is shown in the medium density storage area as stored data 14Ab. File identification data containing the filename of the record data and the location of the original archival copy is shown in the medium density storage area as 14:Id. Row and column coordinate marks are shown in low density peripheral storage area 12L as stored data 14R and 14C. Orientation marks 14:Or are also stored in the low density perimeter. System parameters are stored in the medium density storage area as stored data 14Sy.

BASE MEDIUM 10

Base medium may 10 be any suitable sheet like structure with sufficient body to retain the recording material in position within the data format. The base medium may be a synthetic substance such as mylar (or other plastics) or the base medium may be a natural cellulose substance such as paper. Some plastic bases may be reused by washing off the recording material with a solvent.

RECORDING MATERIAL

The deposited recording material may be any suitable powder or liquid such as toner material which may be deposited on the recording medium, and which contrasts with the base medium. Both powder and liquid toner material may be deposited with sufficient accuracy by conventional laser printers and ink jet printers. The toner recording material may be deposited in a generally circle shaped entry having a diameter at each level of spacial density greater than the diameter of the circle shaped toner entry at the next highest level of spacial density. In one embodiment, the diameters of toner entry at each level of spacial density is twice the diameter at the next highest level. The smallest diameter of toner recording material that can be reliably deposited in the basic storage pixel of the highest of the N levels of spacial density is a basic toner pixel.

SAMPLE HIGH DENSITY ENTRY (FIG. 5)

Another class of control information stored in the lowest density storage sites is a high density sample entry 54S of the basic toner pixel (see FIG. 5). The size of the sample entry (and other entries at all densities) is a function of the base medium, the toner and the printer employed to produce the database. Paper has surface roughness and internal fiber content which absorbs and binds the toner. The capillary action effect between the fibers causes the toner to spread laterally increasing the size of the toner entries. Different grades of paper permit different degrees of spreading.

Toner with a high solvent content is thinner and spreads more readily during the brief drying period after deposition onto the paper. Further, the drying period of the toner varies slightly depending on the ingredients. As a result, the composition of the toner also affects the lateral spreading and ultimate diameter of the toner entries. Each make and model of printer deposits toner in different amounts and in different patterns affecting the toner pixel size.

During scanning of the database on the paper medium, the signal produced by sample entry 54S (and all other entries) depends on the extend of the lateral spreading as determined by the quality of the paper, the composition of the toner, and the particular printer selected. The scan signal generated by the high density sample entry provides a sample scan signal which promotes the identification other high density scan signals from other high density toner pixels. A similar low density sample entry maybe employed to promote identification of scan signals from low density data. Sample entry 54S is positioned within a low density storage site with space on all sides in order to generate a "clean" scan signal.

The embodiment of FIG. 5 shows two levels of spacial density, a high spacial density level and a low spacial density level. Column 56R of row coordinate marks and row 56C of column coordinate marks extend internally through the interior of the storage area intersecting at storage site 54RC which is common to both sets of coordinate marks. The number of low density storage sites forming the interval between coordinate marks is three (R=C=3). The number of high density rows (or columns) in this interval is eighteen (r=c=18).

SPECIFIC EMBODIMENT

The following particulars of the present multi-density storage device are given as an illustrative example of a particular data format, coordinate system, and data density.

Number of Density Levels

N=3 (low density, medium density, and high density)

Data Density (row/columns per inch)

low density storage area—25 medium density storage area—50
high density storage area—150

Edge Progression of Storage Sites 1 low density=2 medium density=6 high density

Area Progression of Storage Sites 1 low density=4 medium density=36 high density Low Density Coordinate Marks per Interval

R=C=2

High Density Rows/Columns per Interval r=c=12

The values, dimensions, and other information given above are not intended as defining the limitations of the invention. Numerous other applications and configurations are possible.

INDUSTRIAL APPLICABILITY

It will be apparent to those skilled in the art that the objects of this invention have been achieved by providing a multi-density storage device for recording digital data. The control information is stored at a lower density level which is physically more stable. The record data is stored at a higher density level which is more compact. In general, the data format may be varied to suit particular data requirements and applications.

CONCLUSION

Clearly various changes may be made in the structure and embodiments shown herein without departing from the concept of the invention. Further, features of the embodiments shown in the various figures may be employed with the embodiments of the other figures.

Therefore, the scope of the invention is to be determined by the terminology of the following claims and the legal equivalents thereof.

I CLAIM AS MY INVENTION:

1. A multi-density data storage device for storing record data and control information at N levels of spacial density thereon, comprising:
   a base medium for carrying the stored record data and stored control information, having N storage areas therein containing a plurality of storage sites in predetermined positions and at the N levels of spacial density, each of the N storage areas containing only storage sites of one of the N levels of spacial density, the position and spacial density of the storage sites defined by a row-column coordinate system across the storage area, the spacial area of the storage sites at each level of spacial density being greater then the spacial area of the storage sites in the next higher level of spacial density;
   recording material deposited onto the base medium at the storage sites within the storage area, for defining the record data and control information in the N levels of spacial density by the selective presence and absence of the recording material;
   record data stored on the base medium by the recording material in the highest density storage sites of the N levels of spacial density; and
   control information stored on the base medium by the recording material in the lowest density storage sites of the N levels of spacial density.

2. The storage device of claim 1, wherein the control information stored at the lowest spacial density storage sites includes low density storage sites which identify the position of the rows and columns in the storage area coordinate system.

3. The storage device of claim 2, wherein the position of the rows in the storage area coordinate system are identified by row coordinate marks at selected low density storage sites, and wherein the position of the columns in the storage area coordinate system are identified by column coordinate marks at selected low density storage sites.

4. The storage device of claim 3, wherein the row coordinate marks extend in the direction of the columns of the storage area, forming a column of row low density storage sites, and wherein the column coordinate marks extend in the direction of the rows of the storage area, forming a row of column low density storage sites.

5. The storage device of claim 4, wherein the column of row coordinate marks and the row of column coordinate marks extend internally through the interior of the storage area.

6. The storage device of claim 4, wherein the column of row coordinate marks extends externally along one side of the storage area, and the row of column coordinate marks extends externally along one end of the storage area.

7. The storage device of claim 4, wherein the row coordinate marks form two columns one on either side of the storage area, and the column coordinate marks form two rows one on either end of the storage area, which extend around the storage area forming a perimeter of low density storage sites.

8. The storage device of claim 7, wherein the low density storage sites at the four corners of the perimeter of low density storage sites are coordinate marks for both the rows and the columns.

9. The storage device of claim 4, wherein the row coordinate marks are deposited at intervals along the column of row low density storage sites, and wherein the column coordinate marks are deposited at intervals along the row of column low density storage sites.

10. The storage device of claim 9, wherein the row interval from one row coordinate mark to the next along the column of row low density storage sites is "R" low density storage sites, and wherein the column interval from one column coordinate mark to the next along the row of column low density storage sites is "C" low density storage sites.

11. The storage device of claim 10, wherein "R" is two low density storage sites and "C" is two low density storage sites.

12. The storage device of claim 9, wherein the row interval from one row coordinate mark to the next along the column of row low density storage sites is "r" rows of the highest level storage sites of the N levels of spacial density, and wherein the column interval from one column coordinate mark to the next along the row of column low density storage sites is "c" columns of the highest level storage sites of the N levels of spacial density.

13. The storage device of claim 9, wherein the low density storage sites in the intervals between the coordinate marks contain at least one orientation mark defining the orientation of the storage area.

14. The storage device of claim 13, wherein the orientation marks are located at predetermined low density storage sites.

15. The storage device of claim 13, wherein the orientation marks indicate the top of the storage area.

16. The storage device of claim 13, wherein each edge of the storage area has an orientation mark.

17. A multi-density data storage device for storing record data and control information at N levels of spacial density thereon, comprising:
 a base medium for carrying the stored record data and stored control information, having a storage area therein containing a plurality of adjacent storage sites in predetermined positions and at the N levels of spacial density, the storage sites at all of the N levels of spacial density having an entry portion for carrying the stored data and a spacer portion for maintaining a spacer distance between the entry portions of adjacent storage sites, the position and spacial density of the storage sites defined by a row-column coordinate system across the storage area, the spacial area of the storage sites at each level of spacial density being greater then the spacial area of the storage sites in the next higher level of spacial density, the smallest area reliably defined by the row and column coordinate system of the storage area is a basic storage pixel in the highest of the N levels of spacial density;
 recording material deposited onto the base medium at the storage sites within the storage area, for defining the record data and control information in the N levels of spacial density by the selective presence and absence of the recording material;
 record data stored on the base medium by the recording material in the highest density storage sites of the N levels of spacial density; and
 control information stored on the base medium by the recording material in the lowest density storage sites of the N levels of spacial density, which control information contains a sample entry of the basic pixel entry of the highest spacial density.

18. The storage device of claim 17, wherein the entry portion of the highest spacial density storage sites is one basic storage pixel and contains one bit of stored data.

19. The storage device of claim 18, wherein the storage sites at each level of spacial density have four times the area of the storage sites of the next higher level of spacial density.

20. The storage device of claim 18, wherein the storage sites are square, and the storage sites at each level of spacial density have an edge dimension twice the edge dimension of the storage sites of the next higher level of spacial density.

21. The storage device of claim 17, wherein the storage area of at least some levels of the N levels of spacial density have a plurality of entry portions for containing a plurality of bits of stored data.

22. The storage device of claim 21, wherein the entry portion contains one byte of stored data.

23. The storage device of claim 17, wherein the deposited recording material is toner.

24. The storage device of claim 23, wherein the toner recording material is deposited in a generally circle shaped entry.

25. The storage device of claim 24, wherein the diameter of the circle shaped toner entry at each level of spacial density is greater than the diameter of the circle shaped toner entry at the next highest level of spacial density.

26. The storage device of claim 24, wherein the diameter of the circle shaped toner entry at each level of spacial density is twice the diameter of the circle shaped toner entry at the next highest level of spacial density.

27. The storage device of claim 24, wherein smallest diameter of toner recording material that can be reliably deposited in the basic storage pixel of the highest of the N levels of spacial density is a basic toner pixel.

28. The storage device of claim 23, wherein the number of levels in the N different levels of spacial density is two, a low spacial density level and a high spacial density level.

29. The storage device of claim 23, wherein the number of levels in the N different levels of spacial density is three, a low spacial density level and a medium spacial density level and a high spacial density level.

30. The storage device of claim 29, wherein the control information is stored at the low spacial density level, the system parameters of the storage device are stored at the medium spacial density level, and the record data is stored at the high spacial density level.

31. The storage device of claim 30, wherein an abstract of the record data is stored at the medium spacial density level.

32. The storage device of claim 30, wherein file identification information concerning the files in the record data is stored at the medium spacial density level.

33. The storage device of claim 30, wherein error code parity data is provided for the record data, which error code parity data is stored in the high spacial density level.

34. The storage device of claim 30, wherein error code parity data is provided for all data stored in the medium spacial density level, which error code parity data is stored in the medium spacial density level.

35. The storage device of claim 23, wherein the base medium is paper.

36. The storage device of claim 23, wherein the toner recording material is carbon pigment.

37. The storage device of claim 23, wherein the toner recording material is colored pigment.

* * * * *